US009525887B2

(12) United States Patent
Ma

(10) Patent No.: US 9,525,887 B2
(45) Date of Patent: Dec. 20, 2016

(54) METHOD FOR PROCESSING AND COMPRESSING THREE-DIMENSIONAL VIDEO DATA

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Shou-Ke Ma, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 287 days.

(21) Appl. No.: 14/261,436

(22) Filed: Apr. 25, 2014

(65) Prior Publication Data

US 2015/0055700 A1 Feb. 26, 2015

(30) Foreign Application Priority Data

Aug. 23, 2013 (CN) .......................... 2013 1 0370897

(51) Int. Cl.
*H04N 19/597* (2014.01)
*H04N 19/59* (2014.01)

(52) U.S. Cl.
CPC ............ *H04N 19/597* (2014.11); *H04N 19/59* (2014.11)

(58) Field of Classification Search
None
See application file for complete search history.

(56) References Cited

U.S. PATENT DOCUMENTS

| 2008/0181305 | A1* | 7/2008 | Cho ................. H04N 19/70 375/240.12 |
| 2011/0032334 | A1 | 2/2011 | Raveendran et al. |
| 2011/0242277 | A1* | 10/2011 | Do ................... H04N 5/272 348/43 |
| 2012/0256951 | A1 | 10/2012 | Tsukagoshi |

(Continued)

FOREIGN PATENT DOCUMENTS

| CN | 101610422 A | 12/2009 |
| CN | 102474661 A | 5/2012 |

(Continued)

*Primary Examiner* — Sath V Perungavoor
*Assistant Examiner* — Janese Duley
(74) *Attorney, Agent, or Firm* — Zhigang Ma

(57) ABSTRACT

In processing and compressing three-dimensional video data, a first color macroblock (MB) and a first depth MB is acquired from a frame. The first depth MB is down-sampled to obtain a second depth MB. Depth information of the second depth MB is embedded to the first color MB, to create a second color MB. The second color MB is compressed and entropy encoded, to obtain video encoding data. The video encoding data is entropy decoded and decompressed, to obtain a third color MB. Depth information, brightness information, and chroma information are acquired from the third color MB, to create a third depth MB and a fourth color MB. A fifth color MB is created according to up-sampled third depth MB and the fourth color MB. The fourth color MB and the fifth color MB are synthesized into the three-dimensional video data.

16 Claims, 4 Drawing Sheets

(56) References Cited

U.S. PATENT DOCUMENTS

| | | | |
|---|---|---|---|
| 2012/0274634 A1* | 11/2012 | Yamada | G06T 7/0051 345/419 |
| 2013/0162629 A1* | 6/2013 | Huang | G06T 7/0071 345/419 |
| 2013/0182755 A1* | 7/2013 | Chen | H04N 19/70 375/240.01 |
| 2014/0028797 A1 | 1/2014 | Hattori et al. | |
| 2014/0112394 A1* | 4/2014 | Sullivan | H04N 19/46 375/240.26 |

FOREIGN PATENT DOCUMENTS

| | | |
|---|---|---|
| CN | 102714744 A | 10/2012 |
| WO | 2012005947 A2 | 1/2012 |
| WO | 2012147621 A1 | 11/2012 |

* cited by examiner

METHOD FOR PROCESSING AND COMPRESSING THREE-DIMENSIONAL VIDEO DATA

BACKGROUND

1. Technical Field

Embodiments of the present disclosure generally relate to data processing technology, and particularly to a method for processing video data.

2. Description of Related Art

Adding depth information to two-dimensional video creates three-dimensional video. The depth information of a video is a distance between a scene and an imaging plane. The depth information is represented by a gray value (000~255), therefore, there is a large amount of data in the three-dimensional video. To store or transmit the three-dimensional video, the three-dimensional video data should be compressed first. However, current video compression technology (e.g. MPEG or H.264) is good at compressing the two-dimensional video data, but not suitable for compressing three-dimensional video data. Therefore, there is room for improvement in the art.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
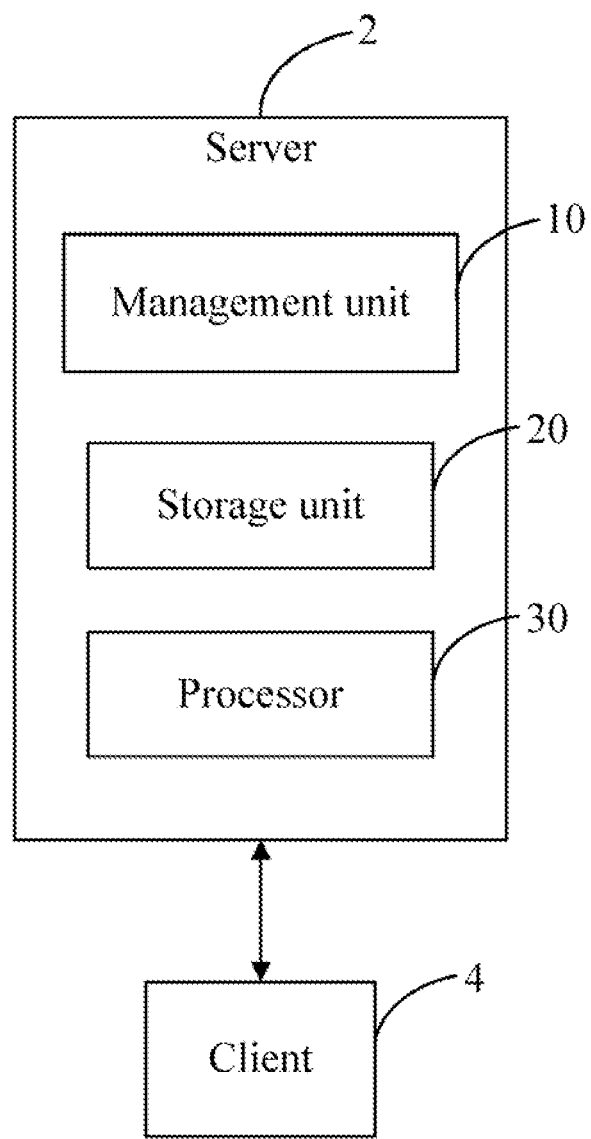
FIG. 1 is a block diagram of an embodiment of a server including a management unit for processing video data.

FIG. 1 is a block diagram of an embodiment of a server 2. In the embodiment, the server 2 includes a management unit 10, a storage unit 20, and a processor 30. The server 2 is electronically connected to one or more clients 4 (only one is shown). The client 4 may shoot three-dimensional video and transmit three-dimensional video data to the server 2. The server 2 receives the three-dimensional video data from a client 4 and stores the three-dimensional video data in the storage unit 20 or transmits the three-dimensional video data to another client 4.

In one embodiment, the management unit 10 may include computerized code in the form of one or more programs that are stored in the storage unit 20, and executed by the processor 30 to perform a method for processing the three-dimensional video data. The storage unit 20 may be a dedicated memory, such as an EPROM or a flash memory.

Figure 2:
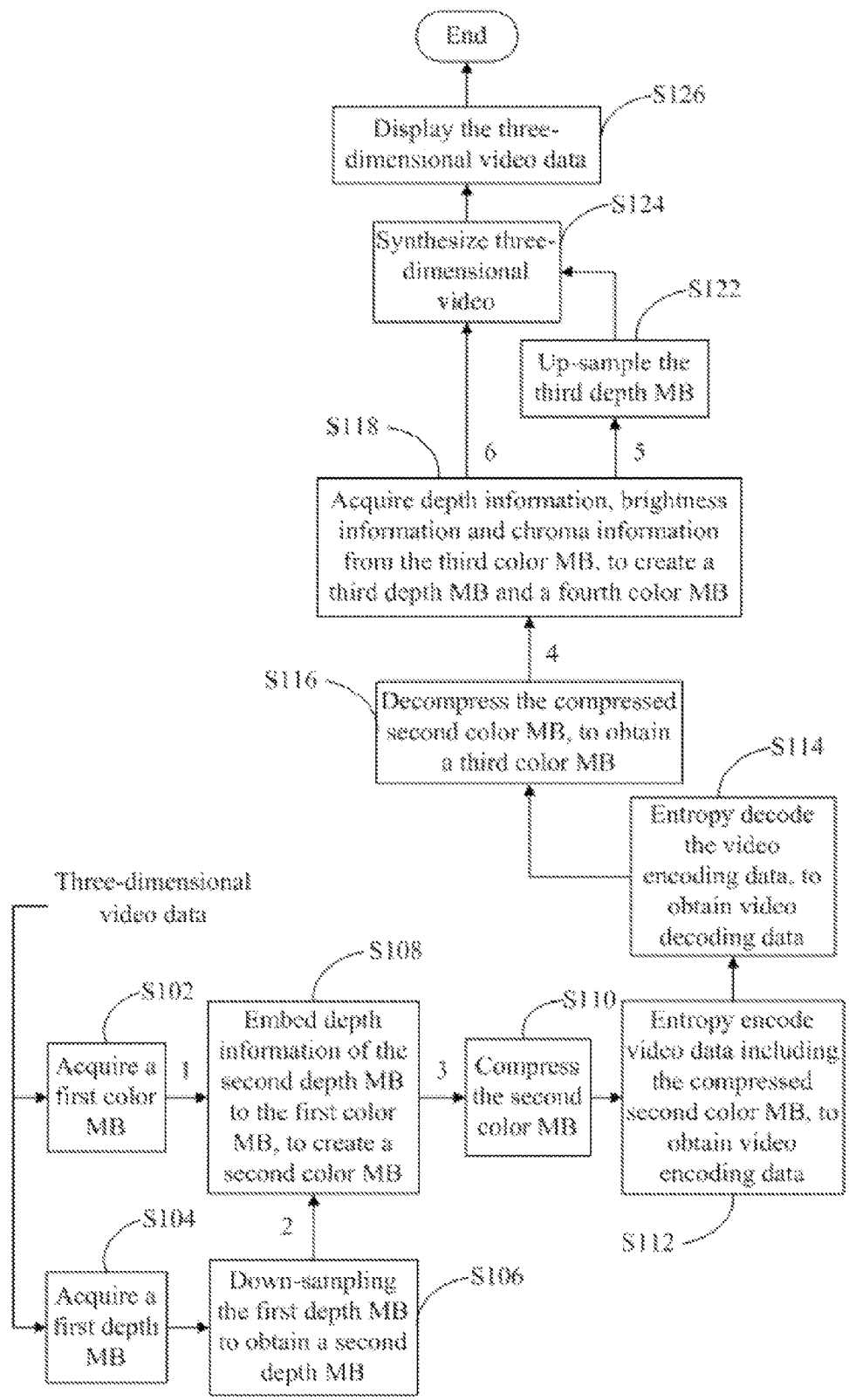
FIG. 2 is a flowchart of an embodiment of a method for processing video data.

FIG. 2 is a flowchart of one embodiment of a method for processing three-dimensional video data. Depending on the embodiment, additional steps may be added, others removed, and the ordering of the steps may be changed. The method for processing three-dimensional video data includes the following steps.

In step S102, acquiring a plurality of frames from the three-dimensional video data and acquiring a first color macroblock (MB) from one of the acquired frames. In the embodiment, the first color MB has 16*16 pixels. A format of the first color MB is Y:Cb:Cr=4:4:4

In step S104, acquiring a first depth MB corresponding to the first color MB from the acquired frame. In the embodiment, the first color MB and the first depth MB both have 16*16 pixels. A format of the first depth MB is Y:Cb:Cr=4:0:0.

In step S106, down-sampling the first depth MB according to a sampling proportion 1/N, to obtain a second depth MB. In the embodiment, the second depth MB has 4*4 pixels, the sampling proportion is 1/16.

In step S108, embedding depth information of the second depth MB to the first color MB, to create a second color MB including the depth information. A detailed description of step S108 is given in FIG. 3.

Figure 3:
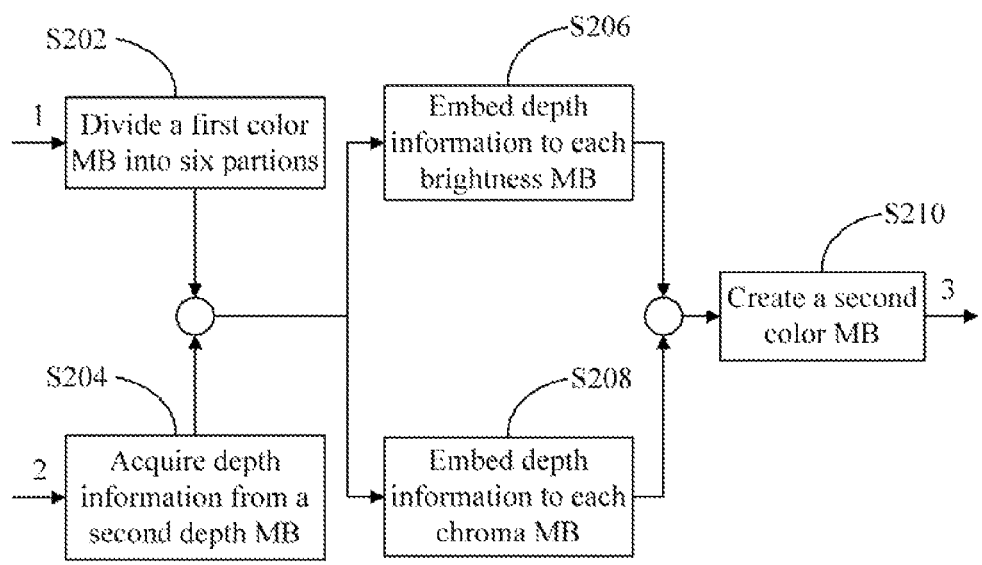
FIG. 3 is a flowchart detailing step S108 in FIG. 2.

As shown in step S202 of FIG. 3, dividing the first color MB into six partitions. The six partitions include four brightness MBs and two chroma MBs. The brightness MBs and the chroma MBs all have 8*8 pixels.

In step S204, acquiring depth information from the second depth MB.

In step S206, embedding the depth information to each of the brightness MBs. In detail, two pixels of each of the brightness MBs are replaced with two pixels of the second depth MB.

In step S208, embedding the depth information to each of the chroma MBs. In detail, four pixels of each of the chroma MBs are replaced with four pixels of the second depth MB. In the embodiment, the two pixels of each of the brightness MBs and the four pixels of each of the chroma MBs may be replaced with pixels in corresponding position of the second depth MB.

In step S210, creating a second color MB according to the brightness MBs and the chroma MBs embedded with the depth information. In the embodiment, the second color MB includes the four brightness MBs and two chroma MBs in which the depth information has been embedded.

Returning to FIG. 2, in step S110, compressing the second color MB. In the embodiment, the compression includes discrete cosine transform (DCT) and quantization.

In step S112, entropy encoding video data including the compressed second color MB, to obtain video encoding data. The video encoding data is transmitted to a network layer (not shown in FIG. 1) of the server 2. The network layer stores the video encoding data or transmits the video encoding data to one of the clients 4.

Steps S114-S126 in FIG. 2 are executed by the client 4 which receives the video encoding data. In step S114, entropy decoding the video encoding data, to obtain video decoding data. The client 4 acquires a plurality of frames from the video decoding data, and processes each of the frames in sequence. The frame includes the compressed second color MB.

In step S116, decompressing (e.g., inverse DCT and inverse quantization) the compressed second color MB, to obtain a third color MB. The third color MB includes four brightness MBs and two chroma MBs.

In step S118, acquiring depth information, brightness information, and chroma information from the third color MB, to create a third depth MB and a fourth color MB. A detailed description of step S118 is given in FIG. 4.

Figure 4:
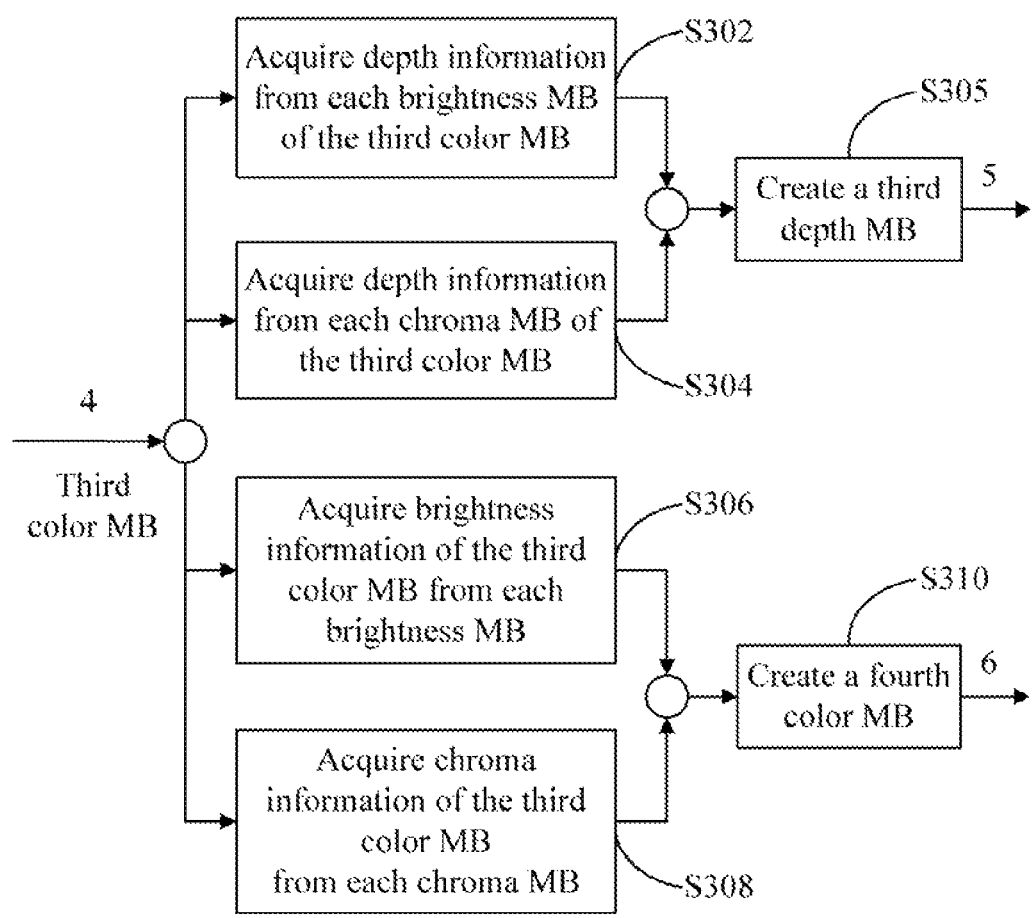
FIG. 4 is a flowchart detailing step S118 in FIG. 2.

As shown in step S302 of FIG. 4, acquiring depth information from each of the brightness MBs of the third color MB. It is understood that the depth information has been embedded to two pixels of each of the brightness MBs in step S206.

In step S304, acquiring depth information from each of the chroma MBs of the third color MB. It is understood that the depth information has been embedded to four pixels of each of the chroma MBs in step S208.

In step S305, creating a third depth MB according to the acquired depth information from the brightness MBs and the chroma MBs.

In step S306, acquiring brightness information of the third color MB from each of the brightness MBs.

In step S308, acquiring chroma information of the third color MB from each of the chroma MBs.

In step S310, creating a fourth color MB which does not include the depth information according to the acquired brightness information and chroma information.

Returning to step S122 of FIG. 2, up-sampling the third depth MB, to obtain a fourth depth MB.

In step S124, creating a fifth color MB according to the fourth depth MB and the fourth color MB, and synthesizing the fourth color MB and the fifth color MB to a frame of three-dimensional video data.

In step S126, displaying the three-dimensional video data on a display device (not shown in FIG. 1) connected to the client 4.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method being executed by a processor of a server, the server being electronically connected to one or more clients, the method comprising:
    (a) acquiring a first color macroblock (MB) and a first depth MB from a frame of three-dimensional video data;
    (b) down-sampling the first depth MB according to a sampling proportion 1/N, to obtain a second depth MB;
    (c) embedding depth information of the second depth MB to the first color MB, to create a second color MB, comprising:
        dividing the first color MB into four brightness MBs and two chroma MBs;
        acquiring depth information from the second depth MB;
        embedding the depth information to each of the brightness MBs and chroma MBs, by replacing two pixels of each of the brightness MBs with two pixels of the second depth MB, and replacing four pixels of each of the chroma MBs with four pixels of the second depth MB;
        creating the second color MB according to the brightness MBs and the chroma MBs embedded with the depth information;
    (d) compressing the second color MB; and
    (e) entropy encoding video data including the compressed second color MB, to obtain video encoding data.

2. The method as claimed in claim 1, wherein the sampling proportion is 1/16.

3. The method as claimed in claim 1, wherein the compression comprises discrete cosine transform and quantization.

4. The method as claimed in claim 1, wherein the video encoding data is stored in the server or transmitted to one of the one or more clients.

5. The method as claimed in claim 1, wherein the two pixels of each of the brightness MBs and the four pixels of each of the chroma MBs are replaced with pixels in corresponding position of the second depth MB.

6. The method as claimed in claim 1, further comprising:
    (f) entropy decoding the video encoding data, to obtain video decoding data;
    (g) decompressing the compressed second color MB of a frame of the video decoding data, to obtain a third color MB; and
    (h) acquiring depth information, brightness information, and chroma information from the third color MB, to create a third depth MB and a fourth color MB; and
    (i) up-sampling the third depth MB to obtain a fourth depth MB; and
    (j) creating a fifth color MB according to the fourth depth MB and the fourth color MB, and synthesizing the fourth color MB and the fifth color MB to a frame of three-dimensional video data.

7. The method as claimed in claim 6, wherein the decompression comprises inverse discrete cosine transform and inverse quantization.

8. The method as claimed in claim 6, wherein step (h) further comprises:
    acquiring depth information from each of the brightness MBs and chroma MBs of the third color MB;
    creating a third depth MB according to the acquired depth information;
    acquiring brightness information and chroma information of the third color MB from each of the brightness MBs and chroma MBs; and
    creating a fourth color MB according to the acquired brightness information and chroma information.

9. A non-transitory storage medium storing a set of instructions, the set of instructions being executed by a processor of a server electronically connected to one or more clients, to perform a method comprising:
    (a) acquiring a first color macroblock (MB) and a first depth MB from a frame of three-dimensional video data;
    (b) down-sampling the first depth MB according to a sampling proportion 1/N, to obtain a second depth MB;
    (c) embedding depth information of the second depth MB to the first color MB, to create a second color MB, comprising:
        dividing the first color MB into four brightness MBs and two chroma MBs;
        acquiring depth information from the second depth MB;
        embedding the depth information to each of the brightness MBs and chroma MBs, by replacing two pixels of each of the brightness MBs with two pixels of the second depth MB, and replacing four pixels of each of the chroma MBs with four pixels of the second depth MB;
        creating the second color MB according to the brightness MBs and the chroma MBs embedded with the depth information;
    (d) compressing the second color MB; and
    (e) entropy encoding video data including the compressed second color MB, to obtain video encoding data.

10. The non-transitory storage medium as claimed in claim 9, wherein the sampling proportion is 1/16.

11. The non-transitory storage medium as claimed in claim 9, wherein the compression comprises discrete cosine transform and quantization.

12. The non-transitory storage medium as claimed in claim 9, wherein the video encoding data is stored in the server or transmitted to one of the one or more clients.

13. The non-transitory storage medium as claimed in claim 9, wherein the two pixels of each of the brightness MBs and the four pixels of each of the chroma MBs are replaced with pixels in corresponding position of the second depth MB.

14. The non-transitory storage medium as claimed in claim 9, wherein the method further comprises:
   (f) entropy decoding the video encoding data, to obtain video decoding data;
   (g) decompressing the compressed second color MB of a frame of the video decoding data, to obtain a third color MB; and
   (h) acquiring depth information, brightness information, and chroma information from the third color MB, to create a third depth MB and a fourth color MB; and
   (i) up-sampling the third depth MB to obtain a fourth depth MB; and
   (j) creating a fifth color MB according to the fourth depth MB and the fourth color MB, and synthesizing the fourth color MB and the fifth color MB to a frame of three-dimensional video data.

15. The non-transitory storage medium as claimed in claim 14, wherein the decompression comprises inverse discrete cosine transform and inverse quantization.

16. The non-transitory storage medium as claimed in claim 14, wherein step (h) further comprises:
   acquiring depth information from each of the brightness MBs and chroma MBs of the third color MB;
   creating a third depth MB according to the acquired depth information;
   acquiring brightness information and chroma information of the third color MB from each of the brightness MBs and chroma MBs; and
   creating a fourth color MB according to the acquired brightness information and chroma information.

* * * * *